(12) United States Patent
Allen et al.

(10) Patent No.: US 8,770,894 B1
(45) Date of Patent: Jul. 8, 2014

(54) HELICAL STRAKES WITH MOLDED IN STAND-OFFS

(71) Applicant: VIV Solutions LLC, Richmond, TX (US)

(72) Inventors: Donald Wayne Allen, Richmond, TX (US); Julie Ann Dehne, Cypress, TX (US); William Andrew West, Friendswood, TX (US); Troy William Dehne, Cypress, TX (US)

(73) Assignee: VIV Solutions LLC, Richmond, TX (US)

( * ) Notice: Subject to any disclaimer, the term of this patent is extended or adjusted under 35 U.S.C. 154(b) by 34 days.

(21) Appl. No.: 13/725,077

(22) Filed: Dec. 21, 2012

Related U.S. Application Data (60) Provisional application No. 61/580,461, filed on Dec. 27, 2011.

(51) Int. Cl.
*F15D 1/10* (2006.01)

(52) U.S. Cl.
USPC ........................................ 405/211.1; 405/216

(58) Field of Classification Search
USPC .................... 405/211, 211.1, 216; 114/243
See application file for complete search history.

(56) References Cited

U.S. PATENT DOCUMENTS

| | | | |
|---|---|---|---|
| 3,248,886 A * | 5/1966 | Blenkarn ...................... 405/211 |
| 4,474,129 A * | 10/1984 | Watkins et al. ............... 114/243 |
| 4,505,617 A * | 3/1985 | Miller et al. .................. 405/211 |
| 6,401,646 B1 * | 6/2002 | Masters et al. ................ 114/243 |
| 6,565,287 B2 * | 5/2003 | McMillan et al. .......... 405/211.1 |
| 6,685,394 B1 * | 2/2004 | Allen et al. .................... 405/211 |
| 6,695,540 B1 * | 2/2004 | Taquino ........................ 405/216 |
| 6,702,026 B2 * | 3/2004 | Allen et al. .................... 405/216 |
| 6,896,447 B1 * | 5/2005 | Taquino ........................ 405/216 |
| 7,017,666 B1 * | 3/2006 | Allen et al. .................... 405/216 |
| 7,458,752 B2 | 12/2008 | Esselbrugge et al. |
| 7,600,945 B2 * | 10/2009 | Burgess ........................ 405/216 |
| 7,674,074 B2 * | 3/2010 | Masters et al. ................ 405/216 |
| 7,766,580 B2 * | 8/2010 | Dartford et al. .............. 405/216 |
| 8,511,245 B2 * | 8/2013 | Dehne et al. .................. 114/243 |
| 2004/0013473 A1 * | 1/2004 | Gibson ......................... 405/211 |
| 2006/0280559 A1 * | 12/2006 | Allen et al. .................... 405/216 |
| 2008/0025800 A1 * | 1/2008 | Watkins ........................ 405/216 |
| 2008/0050181 A1 * | 2/2008 | Masters et al. ................ 405/211 |
| 2009/0185868 A1 * | 7/2009 | Masters et al. ................ 405/216 |
| 2010/0156088 A1 * | 6/2010 | Masters et al. ................ 405/211 |

* cited by examiner

*Primary Examiner* — Frederick L Lagman

(74) *Attorney, Agent, or Firm* — Blakely Sokoloff Taylor & Zafman LLP (57) ABSTRACT

A vortex-induced vibration (VIV) suppression device including a body having a wall dimensioned to at least partly envelope a tubular member in an interior area of the body. The device further including a fin protruding outward from an exterior surface of the wall and a stand-off member positioned along an interior surface of the wall. The stand-off member dimensioned to space the body away from the tubular member and having a protruding portion formed by the interior surface of the wall and an indention portion formed by the exterior surface of the wall.

14 Claims, 14 Drawing Sheets

HELICAL STRAKES WITH MOLDED IN STAND-OFFS

CROSS-REFERENCE TO RELATED APPLICATION

The application is a non-provisional application of co-pending U.S. Patent Application No. 61/580,461, filed Dec. 27, 2011 and incorporated herein by reference.

FIELD

Vortex-induced vibration (VIV) suppression devices having stand-offs to space the device from an underlying tubular. Other embodiments are also described herein.

BACKGROUND

A difficult obstacle associated with the exploration and production of oil and gas is management of significant ocean currents. These currents can produce vortex-induced vibration (VIV) and/or large deflections of tubulars associated with drilling and production. VIV can cause substantial fatigue damage to the tubular or cause suspension of drilling due to increased deflections.

Helical strakes can be installed over the tubular to mitigate VIV. Helical strakes reduce the correlation of vortex shedding and thereby reduce the synchronization of vortex shedding forces required to produce large vibrations of a long slender tubular.

Typically helical strakes are bonded to the tubular or attached to the tubular so that the strake body is adjacent to the tubular surface. This causes a problem with many cathodic protection systems, which require the circulation of fluid adjacent to the tubular in order for the cathodic protection systems to function properly. Since the helical strake bodies are typically wrapped sufficiently tight against the tubular surface to restrict slipping on a vertical tubular, the cathodic protection systems may be compromised. In addition, the presence of helical strake body adjacent to the tubular surface can also produce unwanted thermal insulation.

SUMMARY

In accordance with an embodiment of the invention, a VIV suppression device is presented with indentations molded into the device that space the body away from an underlying tubular. The indentions can be dimensioned to be sufficiently wide to accommodate a band or banding tool for securely attaching the VIV suppression device to a tubular. The indentions can also be partially or fully filled with a filler to make the exterior surface of the VIV suppression device even.

In accordance with a further embodiment of the invention, stand-offs are attached to the interior surface of a VIV suppression device to space the majority of the body section away from an underlying tubular. The standoffs are dimensioned and positioned to allow a fluid to flow freely between the VIV suppression device and the tubular. Springs or other compressible materials may be used in the stand-offs to allow the VIV suppression device to accommodate changes in the diameter of the tubular.

The above summary does not include an exhaustive list of all aspects of the present invention. It is contemplated that the invention includes all apparatuses that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments disclosed herein are illustrated by way of example and not by way of limitation in the figures of the accompanying drawings in which like references indicate similar elements. It should be noted that references to "an" or "one" embodiment in this disclosure are not necessarily to the same embodiment, and they mean at least one.

DETAILED DESCRIPTION

In this section we shall explain several preferred embodiments with reference to the appended drawings. Whenever the shapes, relative positions and other aspects of the parts described in the embodiments are not clearly defined, the scope of the embodiments is not limited only to the parts shown, which are meant merely for the purpose of illustration. Also, while numerous details are set forth, it is understood that some embodiments may be practiced without these details. In other instances, well-known structures and techniques have not been shown in detail so as not to obscure the understanding of this description.

Figure 1A:
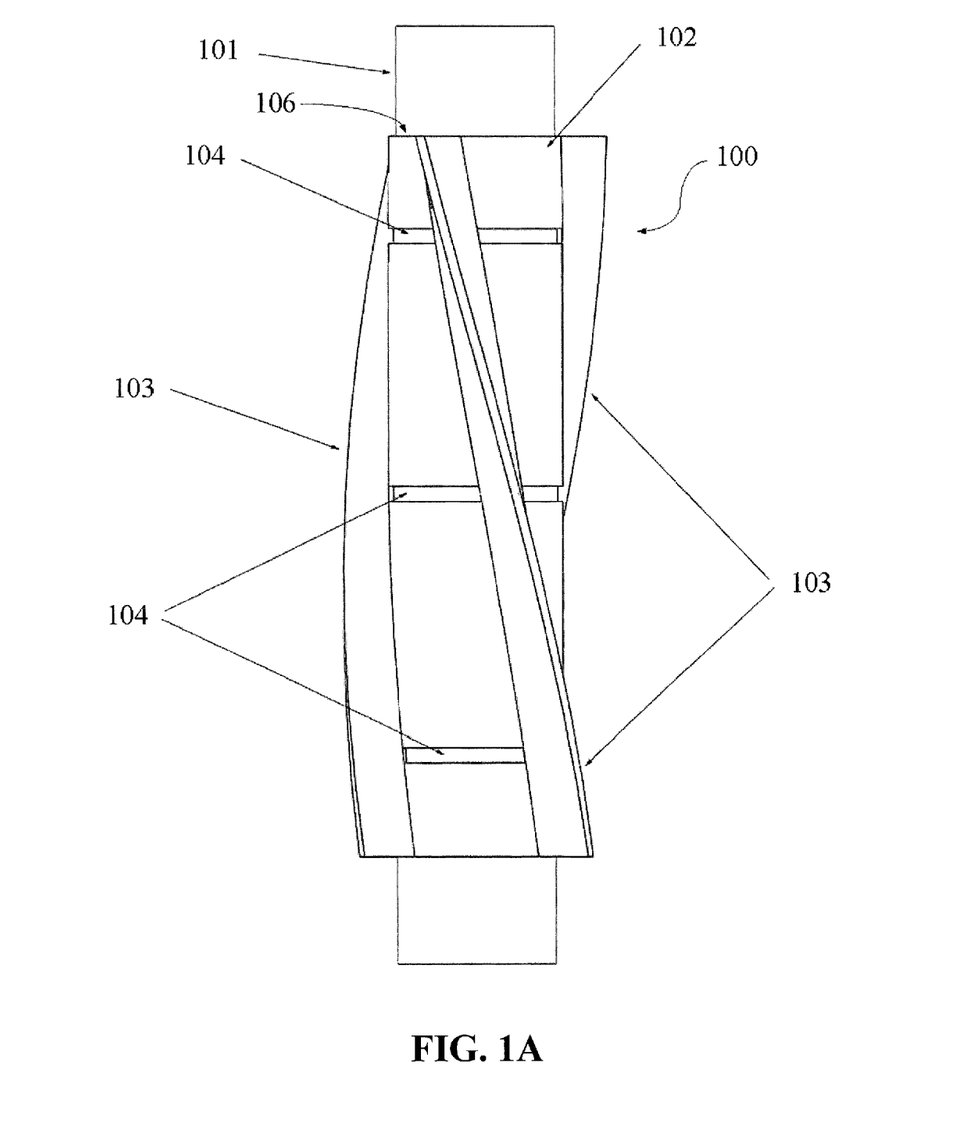
FIG. 1A is a side view of one embodiment of a VIV suppression device with stand-offs on a tubular.

Referring now to an example embodiment of the invention in more detail, FIG. 1A presents VIV suppression device 100 on tubular 101. In one embodiment, VIV suppression device 100 may be a helical strake including body 102, fins 103 and stand-offs 104. Body 102 may be formed by a substantially cylindrical wall 106 dimensioned to encircle tubular 101. In some embodiments, wall 106 is a unitary structure which completely encircles underlying tubular 101. In this aspect, to position VIV suppression device 100 around tubular 101, body 102 is inserted over a free end of tubular 101 and shifted down the length of tubular 101 to the desired position. In other embodiments, wall 106 is formed in modular sections which are aligned with one another around a circumference of tubular 101 and secured together so that body 102 encircles tubular 101. A VIV suppression device formed by modular sections will be described in more detail in reference to FIGS. 2A and 2B.

Again referring to FIG. 1A, in one embodiment, stand-offs 104 are formed by indentations in wall 106. Stand-offs 104 may be oriented such that they that run along a circumferential direction of body 102, as illustrated in FIG. 1A. In one embodiment, stand-offs 104 are formed only along body 102 and between fins 103 such that they do not overlap with a portion of body 102 from which fins 103 extend. Stand-offs 104 may be formed as part of VIV suppression device 100 and molded into body 102 according to any suitable molding process (e.g., injection molding).

Figure 1B:
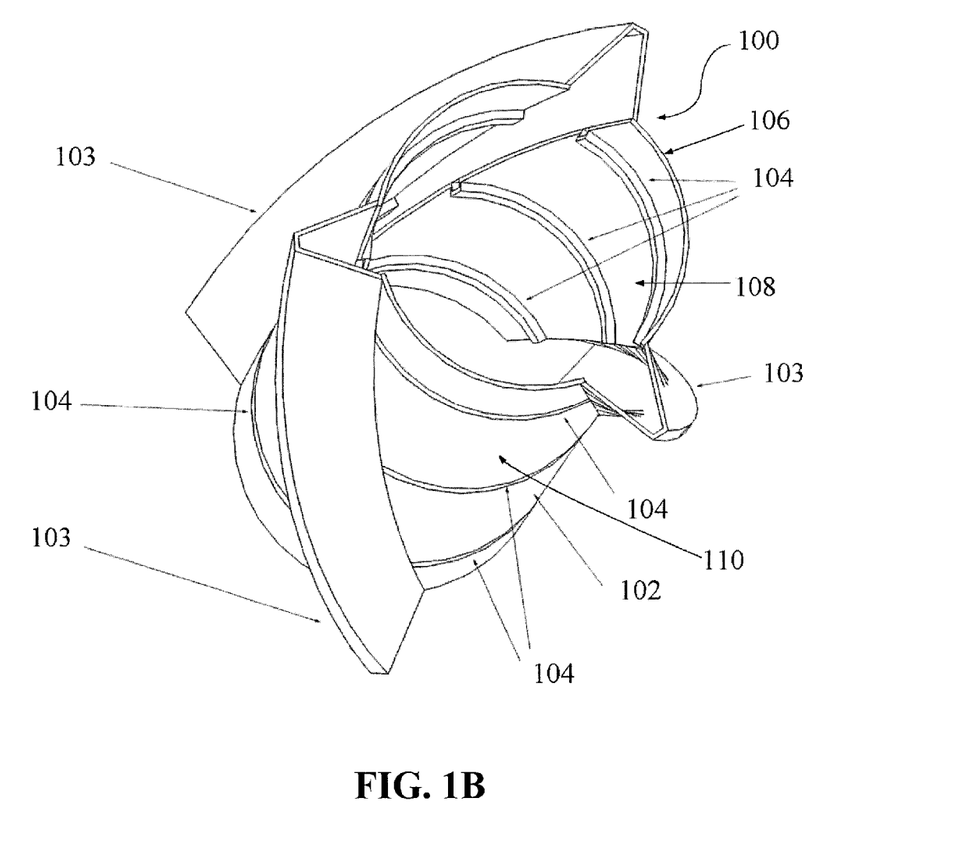
FIG. 1B is a perspective view of one embodiment of the VIV suppression device with stand-offs of FIG. 1A.
Figure 3A:
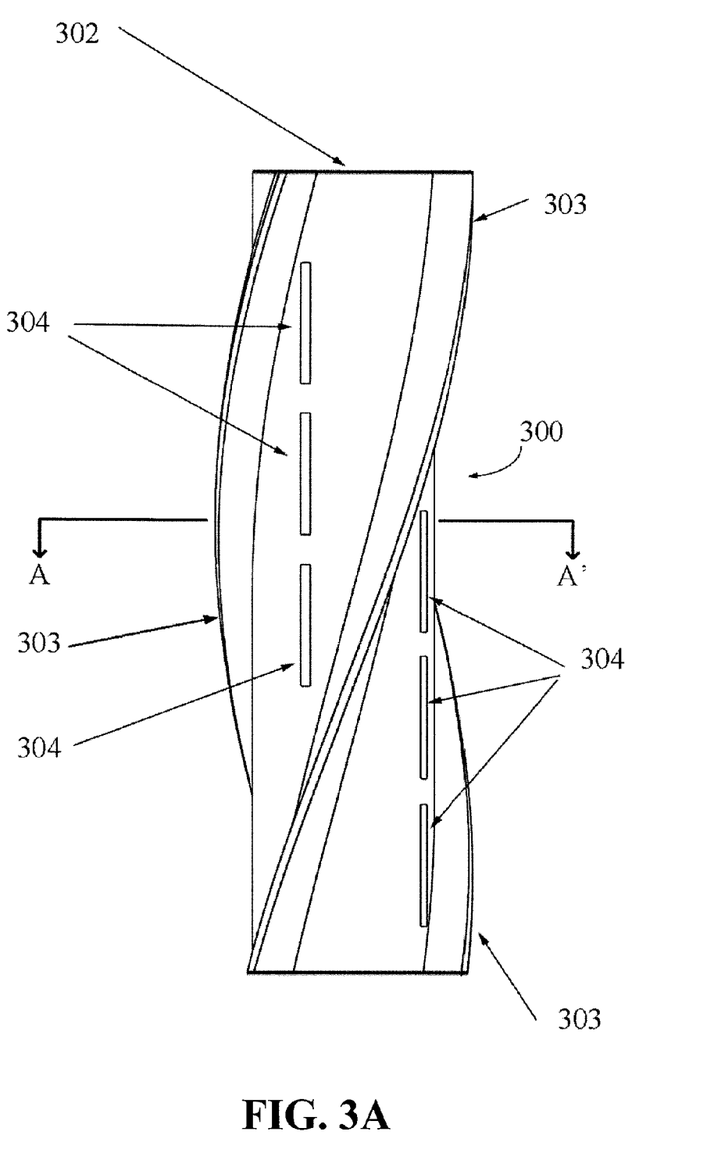
FIG. 3A is a side view of one embodiment of a VIV suppression device with stand-offs that run along a longitudinal direction of the VIV suppression device.
Figure 5:
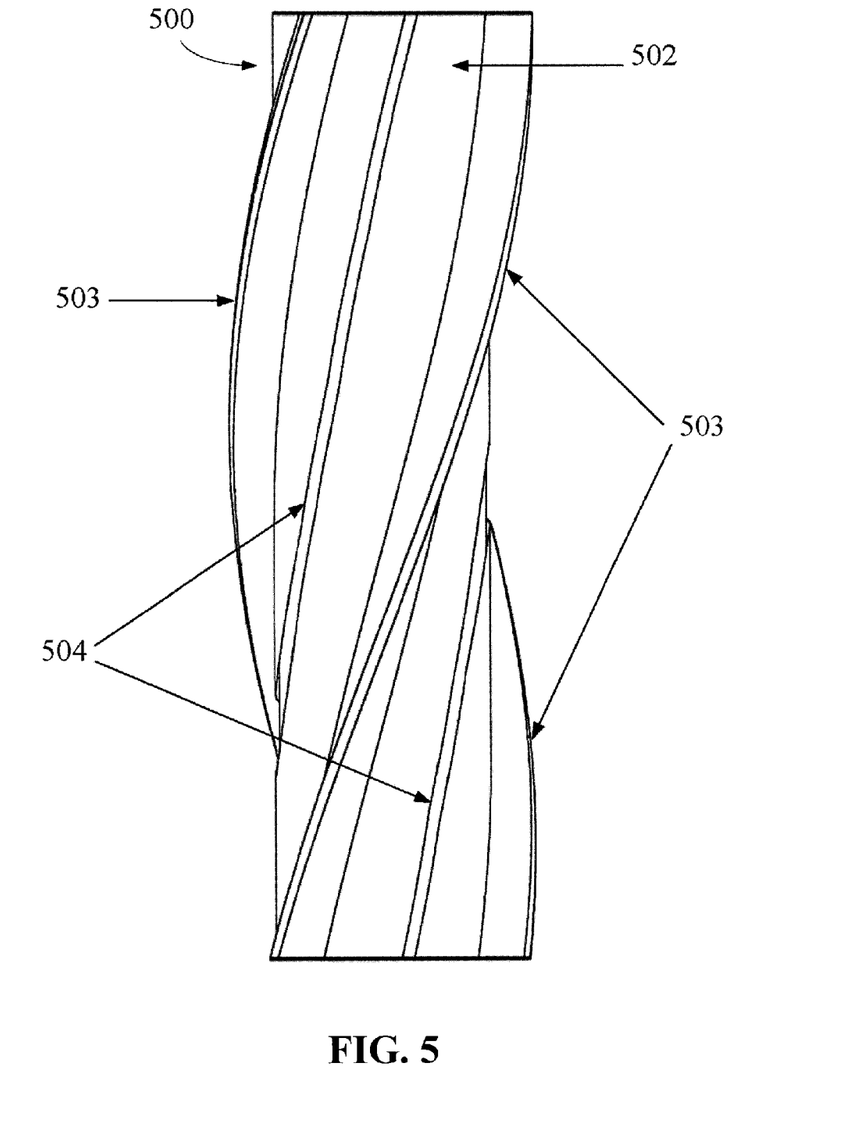
FIG. 5 is a side view of one embodiment of a VIV suppression device with stand-offs that run parallel to the fins on the VIV suppression device.

Still referring to FIG. 1A, stand-offs 104 may be of any suitable depth, width and length. Typically stand-offs 104 will be 0.1 inches to 2 inches deep but may be as much as 12 inches deep. The depth of stand-offs 104 may vary, for example the depth may decrease to zero in order to allow a banding tool to install a band on the interior of the standoff and to allow room for the banding tool to operate. Stand-offs 104 may have a length that runs from one edge of fin 103 to an edge of the adjacent fin 103 but may be shorter than this or may run through fins 103. Stand-offs 104 may be dimensioned to be sufficiently wide to accommodate a band or a banding tool. Stand-offs 104 will typically range from ½ inch to 12 inches wide and may vary in width along a single stand-off 104. Any number of stand-offs 104 may be used and any number of bands may be used. The bands may lie on top of stand-offs 104, inside stand-offs 104 (e.g., see FIG. 1C), or at a different location than stand-offs 104. Stand-offs 104 may have any cross-sectional shape (e.g., square, rectangular, triangular or circular) and may be of the same shape or different shapes. In the illustrated embodiment, stand-offs 104 are substantially square shaped channels formed by three walls (FIG. 1B shows a better view of the cross-sectional shape of stand-offs 104). Stand-offs 104 may also be solid depending upon the manufacturing process used to make VIV suppression device 100. Stand-offs 104 may run in any desired direction including along a circumferential direction of tubular 101 (as shown in the illustrated embodiment in FIG. 1A), along the longitudinal direction of the tubular (i.e., the expected flow direction, as shown in FIG. 3A), or helically such as parallel to fins 103 (as shown in FIG. 5). This embodiment of the invention may apply to any VIV suppression devices such as, but not limited to, strakes or fairings.

Still referring to FIG. 1A, in one embodiment, stand-offs 104 may be of the same material as body 102 of VIV suppression device 100 since it is molded as part of body 102. Body 102 and stand-offs 104 may be made of any suitable material including, but not limited to, metals, plastics, composites, synthetics, fiberglass, rubbers and woods. Alternatively, stand-offs 104 can be formed separate from body 102 and made of the same or different material.

Referring now to FIG. 1B, this figure shows a perspective view of VIV suppression device 100 with body 102 formed by wall 106, fins 103 and stand-offs 104.

Again referring to FIG. 1B, this figure shows how stand-offs 104 appear as indentations on exterior surface 110 of wall 106 and appear as protrusions on interior surface 108 of wall 106. FIG. 1B illustrates how stand-offs 104 can stop at the locations of fins 103. This is so that VIV suppression device 100, complete with body 102, fins 103 and stand-offs 104, can be formed as a single piece. This eliminates the need to attach stand-offs 104 as separate members.

Figure 1C:
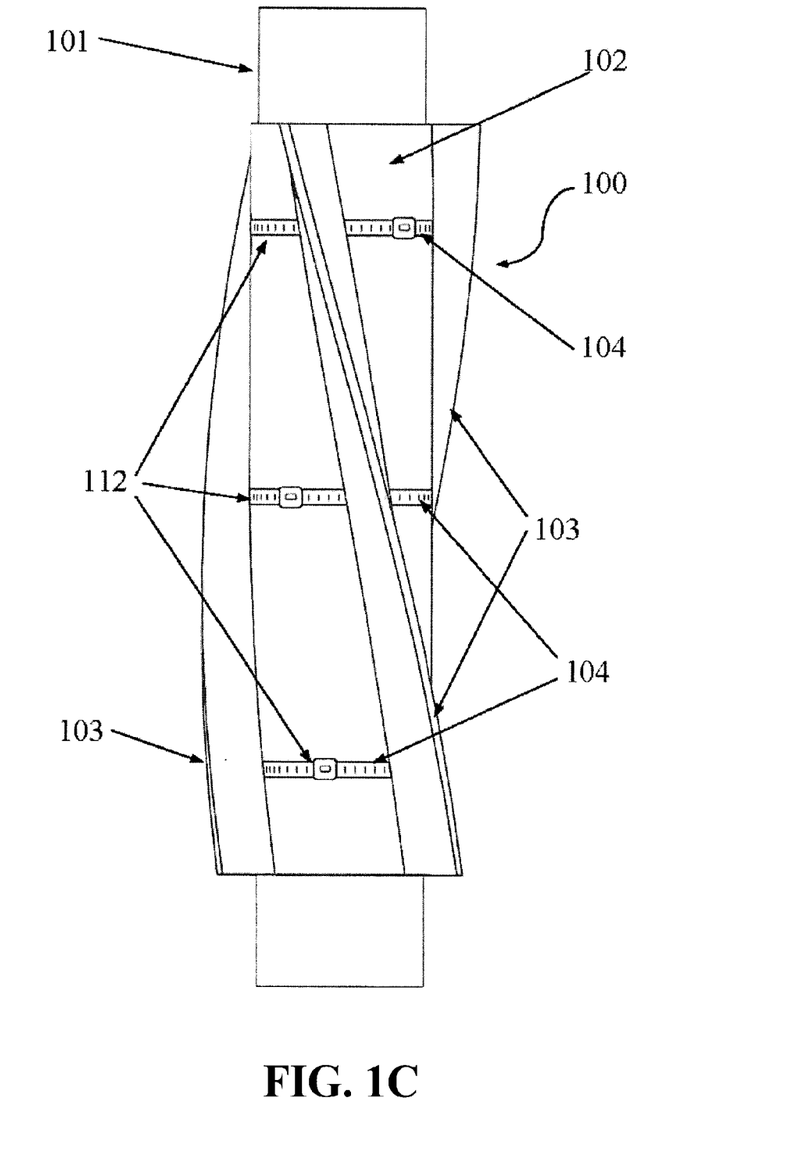
FIG. 1C is a side view of one embodiment of the VIV suppression device with stand-offs of FIG. 1A with bands in the stand-offs.

Referring now to FIG. 1C, this figure shows a side view of VIV suppression device 100 with body 102, fins 103, and bands 112 positioned inside stand-offs 104 to secure VIV suppression device 100 to underlying tubular 101. In this embodiment, stand-offs 104 are dimensioned to be sufficiently wide to accommodate placing bands 112 inside the indentions formed by stand-offs 104. Alternatively, bands 112 can be placed at different locations away from stand-offs 104. Fillers can also be placed inside the indentions formed by stand-offs 104 to make the exterior surface of body 102 even (e.g., see FIGS. 6A and 6B), so that bands 112 can be placed on top of stand-offs 104. Bands 112 may be any type of band or strap type mechanism dimensioned to encircle and secure a VIV suppression device around a tubular.

Figure 2A:
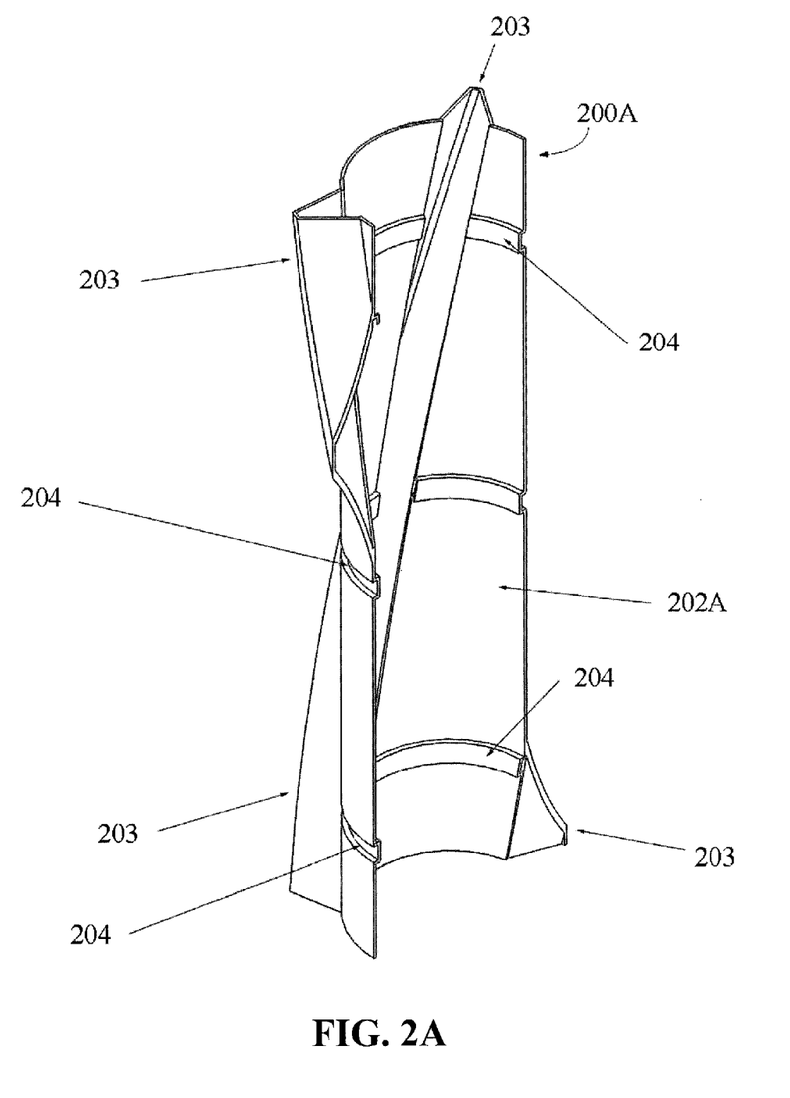
FIG. 2A is a perspective view of one embodiment of a body section of a VIV suppression device with stand-offs.
Figure 2B:
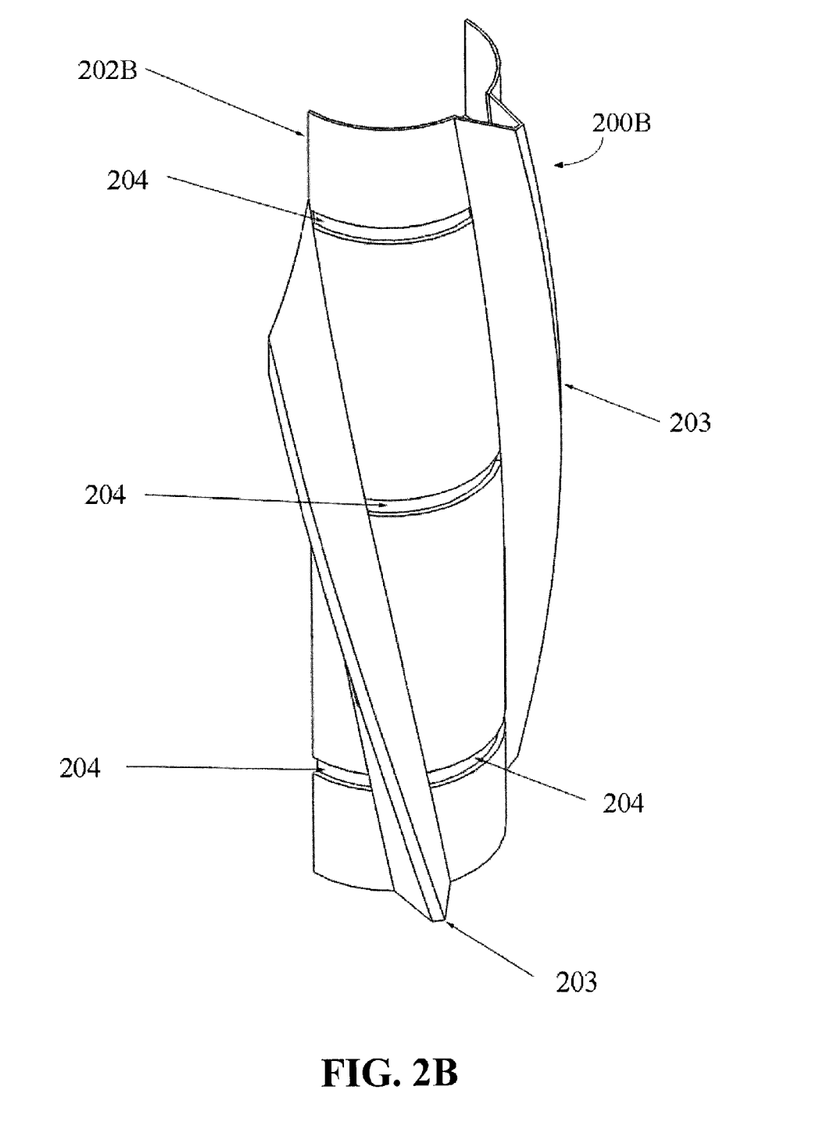
FIG. 2B is a perspective view of one embodiment of another body section of the VIV suppression device of FIG. 2A.

Referring now to FIG. 2A and FIG. 2B, these figures show modular sections of a VIV suppression device which may be combined to form a VIV suppression device which can encircle an underlying tubular, such as that illustrated in FIG. 1A. FIG. 2A shows VIV suppression device section 200A which is formed by body section 202A, fins 203 and stand-offs 204. FIG. 2B shows VIV suppression device section 200B which is formed by body section 202B, fins 203 and stand-offs 204. Body section 202A, fins 203 and stand-offs 204 of VIV suppression device section 200A may be formed as one piece, in that they are all molded into VIV suppression device section 200A together. Similarly, body section 202B, fins 203 and stand-offs 204 of VIV suppression device section 200B may be formed as one piece. In one embodiment, the entire VIV suppression device (e.g., device 100 of FIG. 1A) can be made as a single piece and then cut it into any number of sections later.

Referring to FIG. 2B, VIV suppression device section 200B can be mated with VIV suppression device section 200A of FIG. 2A. Attachment of both halves can be performed by banding the two halves together around the tubular. It is also possible to bolt the two halves together or to attach them by any other suitable means (e.g., hinging two halves at one side and bolting on the other side). It is also possible to have one or more stand-offs 204 on one half of a VIV suppression device (e.g., VIV suppression device section 200A of FIG. 2A) and not have any stand-offs 204, or have a different number of stand-offs 204, on the opposite half of a VIV suppression device (e.g., VIV suppression device section 200B of FIG. 2B).

Referring now to FIG. 3A, this figure shows a side view of VIV suppression device 300 with body 302, fins 303 and stand-offs 304. According to this embodiment, stand-offs 304 may run along the longitudinal direction of body 302 instead of circumferentially around body 302, such as depicted in FIGS. 1A, 1B, 1C, 2A, and 2B. Stand-offs 304 may be discontinuous and oriented in various ways. Any number of stand-offs 304 may be used to restrict the majority of body 302 from contacting an underlying tubular. Representatively, in one embodiment, three stand-offs 304 may be formed between adjacent fins 303. Alternatively, less than three (e.g., two or one) or more than three (e.g., four or more) stand-offs 304 may be formed between adjacent fins 303.

Still referring to FIG. 3A, in one embodiment of the invention, stand-offs 304 are dimensioned so that fluid can flow between body 302 and an underlying tubular. Such configuration is desired since if stand-offs 304 are too dense or are arranged to somewhat seal off the fluid around the tubular, stand-offs 304 may not effectively allow for fluid circulation.

Figure 3B:
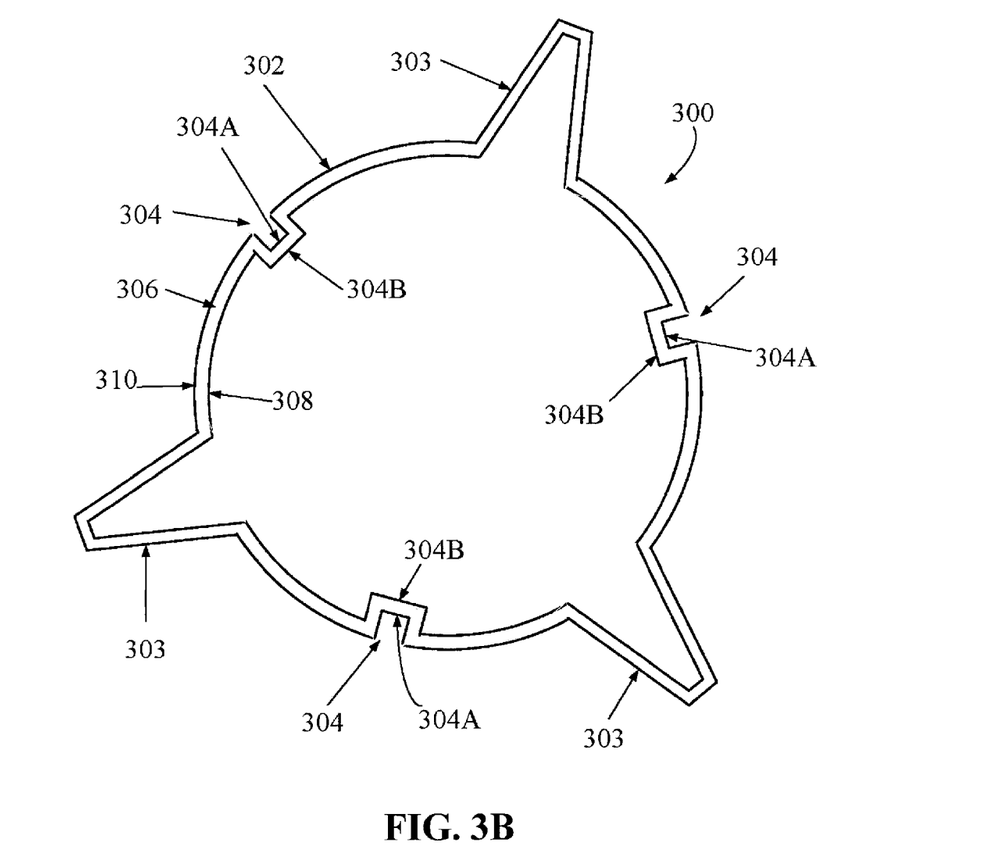
FIG. 3B is a cross-sectional view of one embodiment of the VIV suppression device with stand-offs along line A-A' of FIG. 3A.

FIG. 3B shows a cross-sectional view of VIV suppression device 300 along line A-A' of FIG. 3A. VIV suppression device 300 includes body 302 formed by wall 306, fins 303 and stand-offs 304. From this view, stand-offs 304 running along the longitudinal direction of body 302 can be seen as indentions 304A on exterior surface 310 of wall 306 and protrusions 304B on interior surface 308 of wall 306. Indentations 304A and protrusions 304B may have any cross-sectional shape (e.g., square, rectangular, triangular or circular) and may be of the same shape or different shapes. In the illustrated embodiment, indentation 304A is a substantially square shaped channel having a bottom portion and sidewalls. Protrusion 304B is also substantially square and has side walls and a top wall.

Figure 4A:
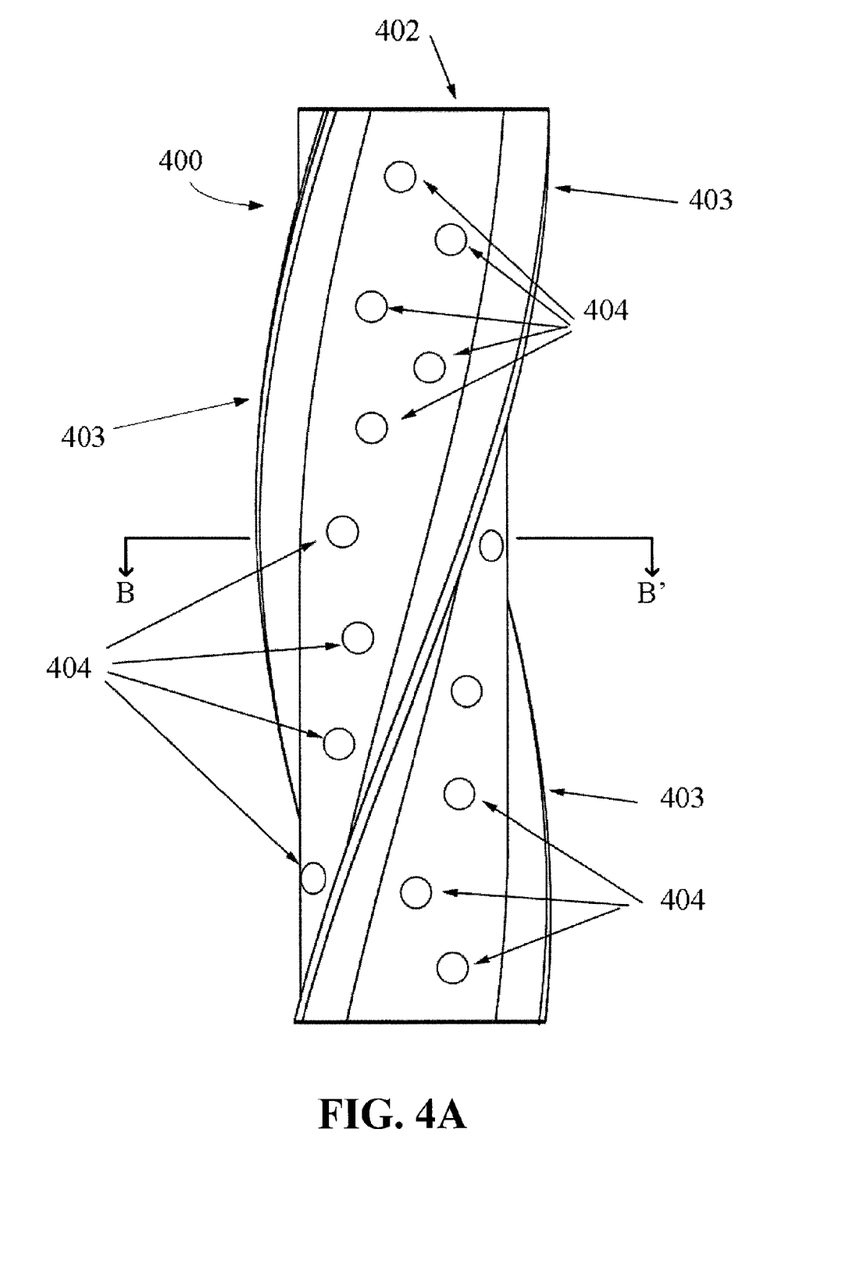
FIG. 4A is a side view of one embodiment of a VIV suppression device with round stand-offs.

Referring now to FIG. 4A, this figure shows a side view of another embodiment of a VIV suppression device having stand-offs. VIV suppression device 400 may include body 402, fins 403 and stand-offs 404. In this embodiment, VIV suppression device 400 includes several rounded stand-offs 404. These rounded stand-offs 404 may be hemispheric shaped domes on the interior surface of body 402 (see FIG. 4B for a cross-sectional view of stand-offs 404), so that when VIV suppression device 400 is secured to a tubular, only the tops of these domes contact the underlying tubular. Any number of stand-offs 404 may be used to space body 402 of VIV suppression device 400 away from an underlying tubular. Stand-offs 404 may be of any suitable geometry and may appear circular, elliptical, rectangular, trapezoidal, or of any other shape when viewed from the outside such as in FIG. 4A.

Figure 4B:
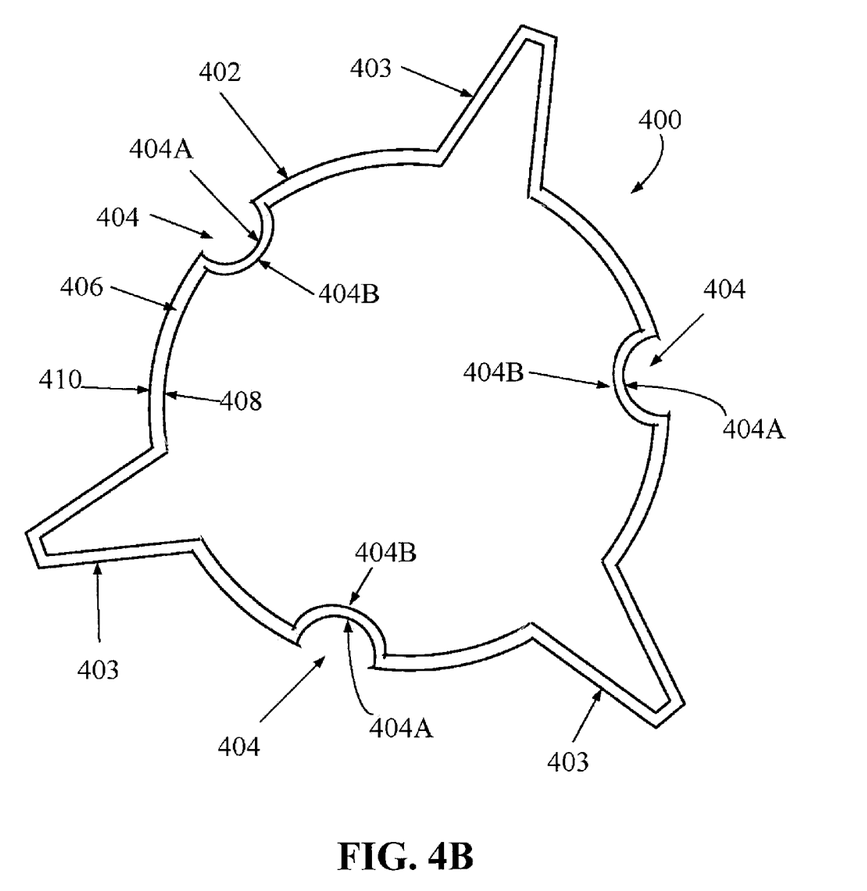
FIG. 4B is a cross-sectional view of one embodiment of the VIV suppression device with round stand-offs along line B-B' of FIG. 4A.

FIG. 4B shows a cross-sectional view of VIV suppression device 400 along line B-B' of FIG. 4A. VIV suppression device 400 includes body 402 formed by wall 406, fins 403, and stand-offs 404. From this view, a perspective of the hemispheric dome shape of stand-offs 404 can be seen. Stand-offs 404 may form protrusions 404B on interior surface 408 of wall 406 and may form indentations 404A on exterior surface 410 of wall 406. Stand-offs 404 may be formed during the molding process of VIV suppression device 400 or may be attached after VIV suppression device 400 is formed. In embodiments where stand-offs 404 are attached to body 402, indentations 404A may be omitted. Stand-offs 404 may be made of any suitable material including, but not limited to, metals, plastics, composites, synthetics, and woods. In embodiments where stand-offs 404 are attached to body 402, stand-offs 404 may also include a compressible material capable of regaining its original shape, such as a spring, or be made of a compressible material capable of regaining its original shape, such as rubbers. This allows VIV suppression device 400 to accommodate changes in the diameter of an underlying tubular. Stand-offs 404 may be made of the same material as body 402 or a different material than body 402.

Referring now to FIG. 5, this figure shows a side view of one embodiment of VIV suppression device 500, with body 502, fins 503, and stand-offs 504. As shown in this embodiment, stand-offs 504 can run in a helical direction, parallel to fins 503, around body 502. As illustrated FIG. 5, there is one stand-off 504 formed between adjacent fins 503. However, more than one (e.g., two or more) stand-offs 504 may be formed between adjacent fins 503.

Figure 6A:
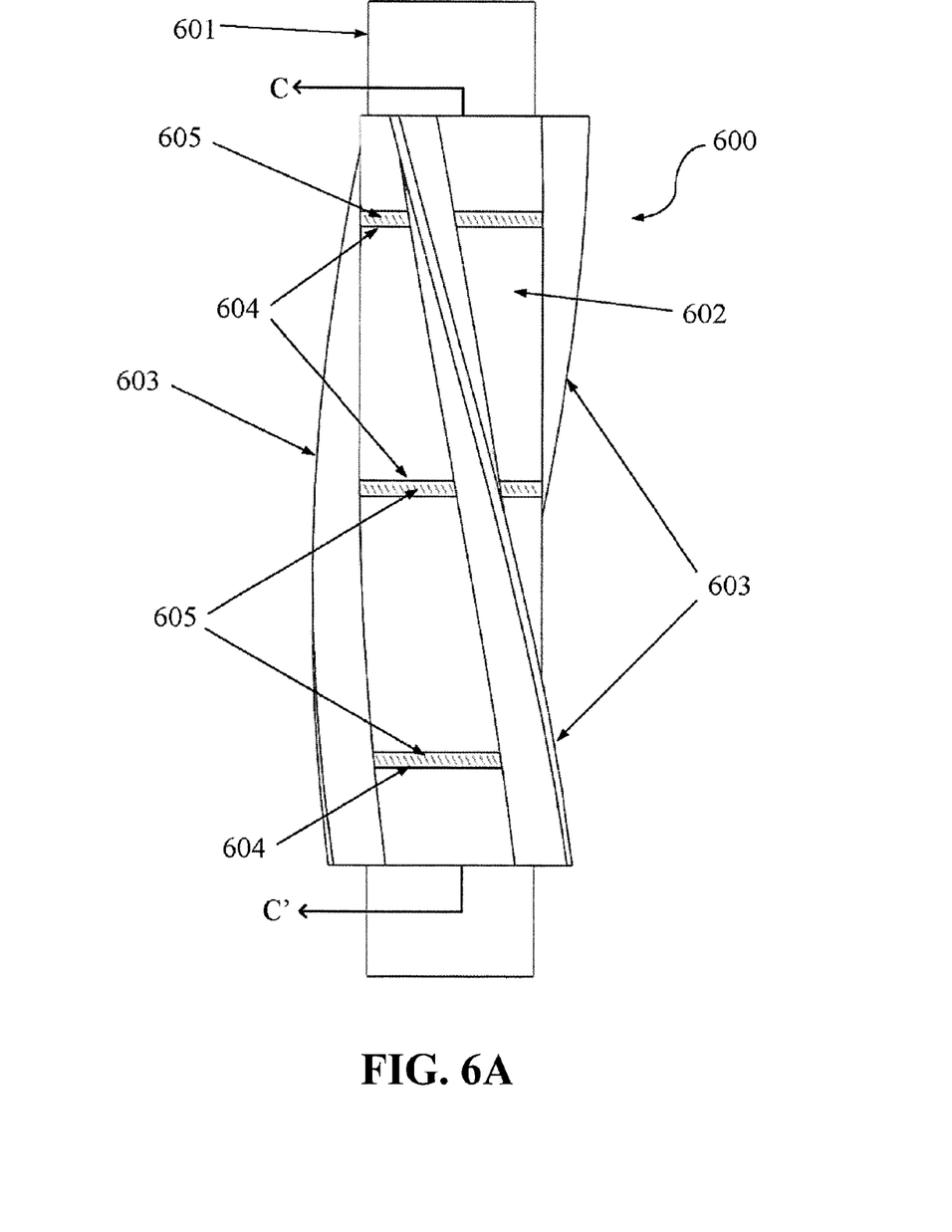
FIG. 6A is a side view of one embodiment of a VIV suppression device on a tubular with fillers in the stand-offs.

Referring to FIG. 6A, this figure shows a side view of VIV suppression device 600 on tubular 601. VIV suppression device 600 includes body 602, fins 603 and fillers 605 which are dimensioned to fit within stand-offs 604. Fillers 605 can be dimensioned to partially or fully fit into any stand-offs 604 present on body 602 of VIV suppression device 600. Fillers 605 may be fitted to make the exterior surface of body 602 even (see FIG. 6B for a better view) so that a banding tool can optionally attach bands at the locations of stand-offs 604. Without the presence of fillers 605, the banding tool may be too wide to fit inside the indentions formed by stand-offs 604 and therefore unable to properly tighten a band. Fillers 605 may be pieces of a metal, plastic, composite, synthetic wood, rubber or any other resilient material or structure dimensioned to fit within any one or more of the previously discussed stand-off indentions. For example, in one embodiment, fillers 605 may be springs, or any other compressible material capable of regaining its original shape that can serve a spring function, to allow VIV suppression device 600 to accommodate changes in the diameter of underlying tubular 601. Fillers 605 may also be pre-compressed for easy transportation and become uncompressed at time of application, such as a spray-able foam.

Still referring to FIG. 6A, any number, size, and shape of fillers 605 may be used to partially or fully fill the indentations formed by stand-offs 604. While fillers 605 will typically be held into place by bands that are placed over them, fillers 605 may also be permanently or temporarily bonded or attached to stand-offs 604 or body 602 of VIV suppression device 600. This bonding or attachment may be made by any suitable means including chemical bonding and mechanical fastening.

Figure 6B:
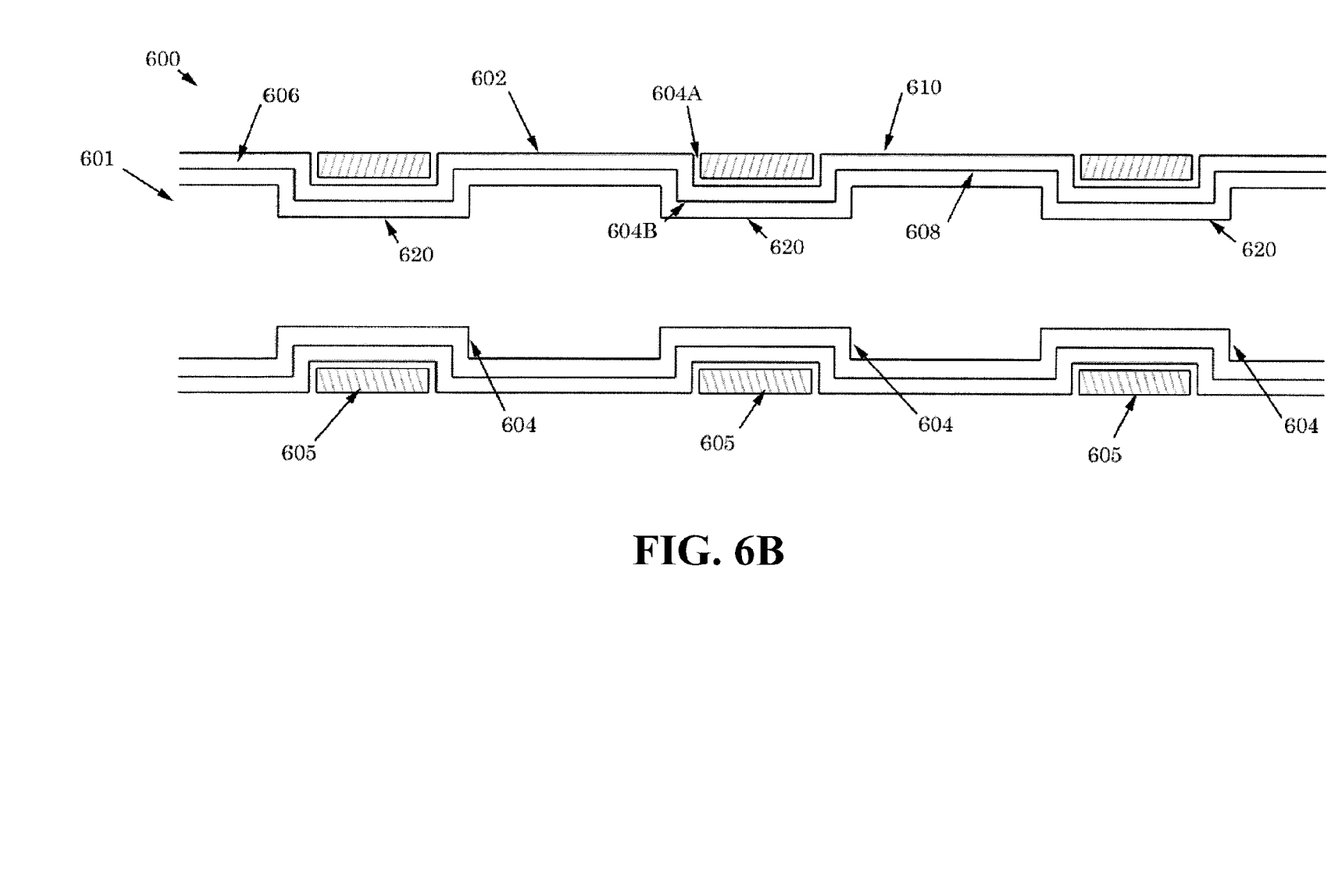
FIG. 6B is a cross-sectional view of one embodiment of the VIV suppression device with fillers in the stand-offs along line C-C' of FIG. 6A.

Referring now to FIG. 6B, this figure shows a cross-sectional view of VIV suppression device 600 along line C-C' of FIG. 6A. VIV suppression device 600 includes body 602 formed by wall 606 and fillers 605 dimensioned to fit within stand-offs 604. Fins 603 are omitted for clarity. As illustrated in this embodiment, fillers 605 are dimensioned to completely fill indentions 604A formed by stand-offs 604, making exterior surface 610 of wall 606 even at the locations of stand-offs 604. Alternatively, fillers 605 can be dimensioned to partially fill indentions 604A formed by stand-offs 604. Fillers 605 may be pieces of a metal, plastic, composite, synthetic wood, rubber or any other resilient material or structure dimensioned to fit within indentions 604A. This view also illustrates an embodiment in which recesses 620 complementary to stand-offs 604 are formed within the exterior surface of tubular 601. Recesses 620 are dimensioned to maintain an alignment of VIV suppression device 600 along the length of the tubular 601. In this aspect, protrusions 604B of stand-offs 604 may align with, and fit within, recesses 620 when VIV suppression device 600 is installed about tubular 601. In some cases, recesses 620 may have a depth less than the height of protrusions 604B such that a gap between the portions of interior surface wall 608 between protrusions 604B and tubular 601 is maintained. It is to be understood, however, that recesses 620 are optional and therefore may be omitted such that tubular 601 has a substantially straight side wall and stand-offs 604 sit on top of the side wall.

Figure 7:
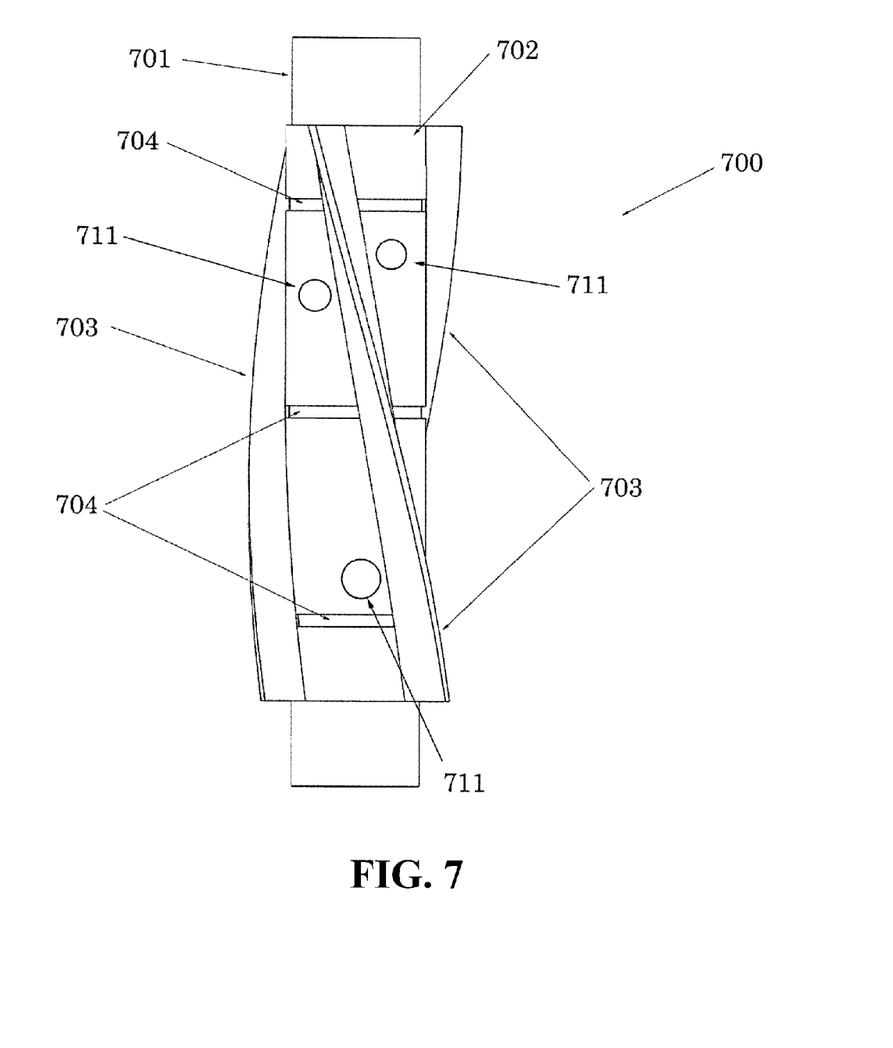
FIG. 7 is a side view of one embodiment of a VIV suppression device on a tubular with stand-offs and holes to allow for additional water circulation.

Referring to FIG. 7, this figure shows a side view of VIV suppression device 700 on tubular 701. VIV suppression device 700 includes body 702, fins 703 and stand-offs 704 as previously discussed. In addition to stand-offs 704 to facilitate water circulation between VIV suppression device 700 and tubular 701, VIV suppression device 700 may include holes 711 formed through body 702. Holes 711 may allow water to flow through VIV suppression device 700. Any number of holes 711 having any size and dimensions suitable to allow for flow of water through body 702 may be formed through body 702. Holes 711 may be used in addition to stand-offs 704 to facilitate water flow, or instead of stand-offs 704 and stand-offs 704 omitted.

Figure 8:
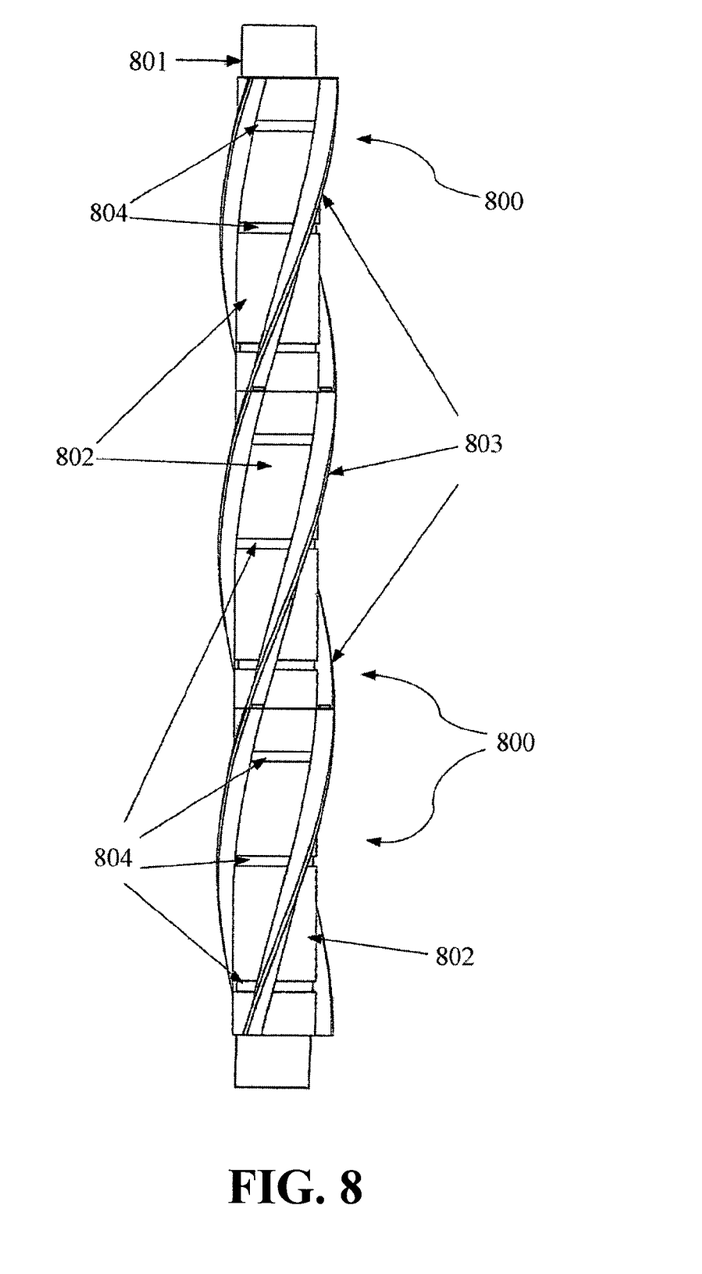
FIG. 8 is a side view of multiple VIV suppression devices fitted together end-to-end on a tubular.

FIG. 8 shows a side view of multiple VIV suppression devices 800 fitted together end-to-end on tubular 801. Each VIV suppression device 800 includes body 802, fins 803 and stand-offs 804. This view illustrates how multiple VIV suppression devices 800 can be fitted together end-to-end to completely envelope a section of tubular 801. Fins 803 are positioned on VIV suppression device 800 such that when two VIV suppression devices 800 are placed next to each other end-to-end, fins 803 on one suppression device 800 align with fins 803 on the other device 800. This allows for an easier molding process for producing VIV suppression devices 800 since VIV suppression devices 800 can be produced in smaller segments. Alternatively, multiple VIV suppression devices 800 can be formed all together during the molding process, and then cut into smaller segments after to produce each individual VIV suppression device 800.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

In the foregoing specification, the invention has been described with reference to specific embodiments thereof. It will, however, be evident that various modifications and changes can be made thereto without departing from the broader spirit and scope of the invention as set forth in the appended claims. For example, the stand-offs may be arranged on the helical strake to fit into an indention on the tubular to avoid slipping. Still further, although the VIV suppression device is illustrated as a helical strake, it is contemplated that stand-offs may be used in connection with any type of VIV suppression device in which a spacing between the device and underlying tubular is desired. For example, the stand-offs may be formed along a body portion of a fairing or any other VIV suppression device having a cylindrical or partially cylindrical body portion which encircles a tubular (e.g., a collar, a clamp, a Henning device, a smooth sleeve or a buoyancy or weighted material dimensioned to encircle a tubular). The specification and drawings are, accordingly, to be regarded in an illustrative rather than a restrictive sense.

What is claimed is:

1. A vortex-induced vibration (VIV) suppression apparatus comprising:
    at least one body having a wall dimensioned to at least partly envelope a tubular member in an interior area of the body;
    at least one fin protruding outward from an exterior surface of the wall; and
    at least one stand-off member positioned along an interior surface of the wall for spacing the body away from the tubular member, the stand-off member having a protruding portion formed by the interior surface of the wall and an indention portion formed by the exterior surface of the wall.

2. The VIV suppression apparatus of claim 1, wherein the stand-off member is formed by molding the protruding portion into the wall of the body.

3. The VIV suppression apparatus of claim 1, further comprising a filling element dimensioned to be positioned within the indention portion.

4. The VIV suppression apparatus of claim 3, wherein the filling element in the indention portion makes the exterior surface of the wall even at the indention portion.

5. The VIV suppression apparatus of claim 3, wherein the filling element is bonded to the indention portion.

6. The VIV suppression apparatus of claim 3, wherein the filling element is held in place by a band placed over the filling element.

7. The VIV suppression apparatus of claim 3, wherein the filling element comprises a compressible material capable of regaining an original shape.

8. The VIV suppression apparatus of claim 1, wherein the stand-off member runs along a circumferential direction of the body.

9. The VIV suppression apparatus of claim 1, wherein the stand-off member runs parallel to the fin.

10. The VIV suppression apparatus of claim 1, wherein the stand-off member runs along a longitudinal direction of the body.

11. The VIV suppression apparatus of claim 1, wherein the indention portion is dimensioned to accommodate a band in the indention portion for securing the VIV suppression apparatus to the tubular member.

12. The VIV suppression apparatus of claim 1, wherein the stand-off member stops at the fin.

13. The VIV suppression apparatus of claim 1, wherein the fin is formed during a molding process of the body.

14. The VIV suppression apparatus of claim 1, wherein the body comprises at least two modular pieces that fit together to form the body.

* * * * *